United States Patent
Mozel et al.

(10) Patent No.: US 10,981,485 B2
(45) Date of Patent: Apr. 20, 2021

(54) ADJUSTABLE CUP HOLDER ASSEMBLY FOR A VEHICLE

(71) Applicant: GM Global Technology Operations LLC, Detroit, MI (US)

(72) Inventors: Daniel P. Mozel, Milford, MI (US); Aaron Lee Maciejewski, Casco, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/555,526

(22) Filed: Aug. 29, 2019

(65) Prior Publication Data

US 2021/0061154 A1 Mar. 4, 2021

(51) Int. Cl.
*B60N 3/10* (2006.01)
(52) U.S. Cl.
CPC ............ *B60N 3/106* (2013.01); *B60N 3/101* (2013.01)
(58) Field of Classification Search
CPC ............... A47G 23/02; A47G 23/0208; A47G 23/0216; B60N 3/106
USPC ........................................................ 220/737
See application file for complete search history.

(56) References Cited

U.S. PATENT DOCUMENTS

| 7,819,728 B2 * | 10/2010 | Beckley | ............... | B60N 3/106 454/155 |
| 2016/0304019 A1 * | 10/2016 | Dargavell | ............ | B60N 3/106 |

* cited by examiner

*Primary Examiner* — Jeffrey R Allen

(57) ABSTRACT

An adjustable cup holder assembly for a vehicle is provided. The assembly comprises a circular cam including an outer body having a center recess formed thereon. The outer body includes a first surface having channels. A twist top includes an outer portion having a center opening. The outer portion includes a connecting surface having apertures. Arcuate members are disposed on the first surface. Each arcuate member comprises a first end arcuately extending to a second end and includes first and second sides. The first side has a first pin extending therefrom and slidably disposed in one of the channels. The second side has a second pin extending therefrom and disposed in one of the apertures. Each first pin is slidably movable along one of the channels when the twist top is rotated in a first or second direction, radially moving the arcuate members to open and close the recess.

16 Claims, 2 Drawing Sheets

ADJUSTABLE CUP HOLDER ASSEMBLY FOR A VEHICLE

INTRODUCTION

The present disclosure relates to holders in vehicles. More particularly, the present disclosure relates to an adjustable cup holder assembly for a vehicle.

During operation of a vehicle, the driver and passenger(s) in many situations carry liquid containers for drinks such as coffee and refreshments. For years, vehicle interiors have been designed to have relatively basic cup holders to receive liquid containers such as sealed cups and mugs. Typical current cup holder technology may require an undesirable amount of space particularly under the center console of a vehicle interior. Moreover, container securement within a cup holder is also an issue at times.

SUMMARY

Thus, while current cup holder technology may achieve their intended purpose, there is a need for a new and improved assembly.

According to several aspects, an adjustable cup holder assembly with a slide mechanism for a vehicle is provided. In one aspect, the assembly comprises a circular cam including a base having a center recess formed thereon defining an outer body. The outer body includes a first surface having a plurality of open channels formed radially thereon.

In this embodiment, the assembly further comprises a circular twist top including an outer portion having a center opening formed therethrough. The outer portion includes a connecting surface having a plurality of apertures formed thereon.

In this embodiment, the assembly further comprises a plurality of arcuate members disposed on the first surface. Each arcuate member has a first end arcuately extending to a second end. Each arcuate member has a first side and an opposing second side. The first side has a first pin extending therefrom adjacent the first end. Each of the first pins is slidably disposed in one of the plurality of channels. The second side has a second pin extending therefrom adjacent the second end. Each of the second pins is disposed in one of the plurality of apertures, connecting the arcuate members with the circular twist top. Each of the first pins is slidably movable along one of the plurality of channels when the twist top is rotated in one of a first direction and a second direction radially moving the arcuate members to open and close the recess.

In one embodiment, each first end of the plurality of arcuate members is disposed on and in contact with the first surface such that the arcuate members are in partial stacking relationship.

In another embodiment, the outer body of the circular cam has an outer wall and an inner wall. Each of the plurality of channels is radially formed on the first surface from the outer wall to the inner wall. In another example, each of the plurality of arcuate members has a concave side and a convex side. A portion of the convex side is aligned with the outer wall of the outer body.

In another example, the twist top includes a rotation axis through the center opening and is axially aligned with the circular cam. The twist top is rotatable about the rotation axis in one of the first and second directions relative to the circular cam to slidably move the first pins along one of the plurality of channels, radially moving the arcuate members to open and close the recess.

In yet another embodiment, the twist top comprises a circumferential wall having a gripping member disposed thereabout for gripping and rotating the twist top.

In another example, the first ends of the plurality of arcuate members radially slide inward along the first surface when the twist top is rotated in the first direction to close the recess. Accordingly, the first ends of the plurality of arcuate members radially slide outward along the first surface when the twist top is rotated in the second direction to open the recess relative to the outer body.

In still another example, the recess has an opening. The opening is variably covered by the arcuate members when the twist top is rotated in the first direction and variably uncovered when the twist top is rotated in the second direction. In this embodiment, outer body has an outer wall and an inner wall wherein each of the plurality of arcuate members has a concave side and a convex side. The convex side has a curvature defining a variability of the opening of the recess when the twist top is rotated in one of the first and second directions.

In another aspect of the disclosure, an adjustable cup holder assembly with a slide mechanism for a vehicle is disclosed. The assembly comprises a circular cam including a base having a center recess formed thereon defining an outer body. The outer body includes a first surface having a plurality of open channels formed radially thereon.

In this embodiment, the assembly comprises a circular twist top including an outer portion having a center opening formed therethrough. The outer portion includes a connecting surface having a plurality of apertures formed thereon.

The assembly further comprises a plurality of arcuate members disposed on the first surface. Each arcuate member has a first end arcuately extending to a second end. Each arcuate member has a first side and an opposing second side. The first side has a first pin extending therefrom adjacent the first end. Each of the first pins is slidably disposed in one of the plurality of channels. The second side has a second pin extending therefrom adjacent the second end. Each of the second pins is disposed in one of the plurality of apertures.

In this embodiment, each of the first pins is slidably movable along one of the plurality of channels when the twist top is rotated in one of a first direction and a second direction radially moving the arcuate members to open and close the recess. Moreover, the twist top includes a rotation axis through the center opening and is axially aligned with the circular cam. The twist top is rotatable about the rotation axis in one of the first and second directions relative to the circular cam to slidably move the first pins along one of the plurality of channels, radially moving the arcuate members to open and close the recess.

In one embodiment, each first end of the plurality of arcuate members is disposed on and in contact with the first surface such that the arcuate members are in partial stacking relationship.

In another embodiment, the outer body of the circular cam has an outer wall and an inner wall. Each of the plurality of channels is radially formed on the first surface from the outer wall to the inner wall. In another embodiment, each of the plurality of arcuate members has a concave side and a convex side, a portion of the convex side being aligned with the outer wall of the outer body.

In still another embodiment, the twist top comprises a circumferential wall having a gripping member disposed thereabout for gripping and rotating the twist top.

In yet another embodiment, the first ends of the plurality of arcuate members radially slide inward along the first surface when the twist top is rotated in the first direction to close the recess and wherein the first ends of the plurality of arcuate members radially slide outward along the first surface when the twist top is rotated in the second direction to open the recess relative to the outer body.

In another embodiment, the recess has an opening. The opening is variably covered by the arcuate members when the twist top is rotated in the first direction and variably uncovered when the twist top is rotated in the second direction. In this embodiment, the outer body has an outer wall and an inner wall. Each of the plurality of arcuate members has a concave side and a convex side. The convex side has a curvature defining a variability of the opening of the recess when the twist top is rotated in one of the first and second directions.

In yet another aspect, an adjustable cup holder assembly with a slide mechanism for a vehicle is provided. The assembly comprises a circular cam including a base having a center recess formed thereon defining an outer body. The outer body includes a first surface having a plurality of open channels formed radially thereon. The assembly further comprises a circular twist top including an outer portion having a center opening formed therethrough. The outer portion includes a connecting surface having a plurality of apertures formed thereon.

In this embodiment, a plurality of arcuate members is disposed on the first surface. Each arcuate member has a first end arcuately extending to a second end. Each arcuate member has a first side and an opposing second side. Each first side has a first pin extending therefrom adjacent the first end. Each of the first pins is slidably disposed in one of the plurality of channels. The second side has a second pin extending therefrom adjacent the second end. Each of the second pins is disposed in one of the plurality of apertures.

In this embodiment, each of the first pins is slidably movable along one of the plurality of channels when the twist top is rotated in one of a first direction and a second direction radially moving the arcuate members to open and close the recess. Moreover, the twist top includes a rotation axis through the center opening and is axially aligned with the circular cam. The twist top is rotatable about the rotation axis in one of the first and second directions relative to the circular cam to slidably move the first pins along one of the plurality of channels. Further, the first ends of the plurality of arcuate members radially slide inward along the first surface when the twist top is rotated in the first direction to close the recess. Accordingly, the first ends of the plurality of arcuate members radially slide outward along the first surface when the twist top is rotated in the second direction to open the recess relative to the outer body.

In another embodiment, each first end of the plurality of arcuate members is disposed on and in contact with the first surface such that the arcuate members are in partial stacking relationship.

In yet another embodiment, the outer body of the circular cam has an outer wall and an inner wall. Each of the plurality of channels is radially formed on the first surface from the outer wall to the inner wall.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
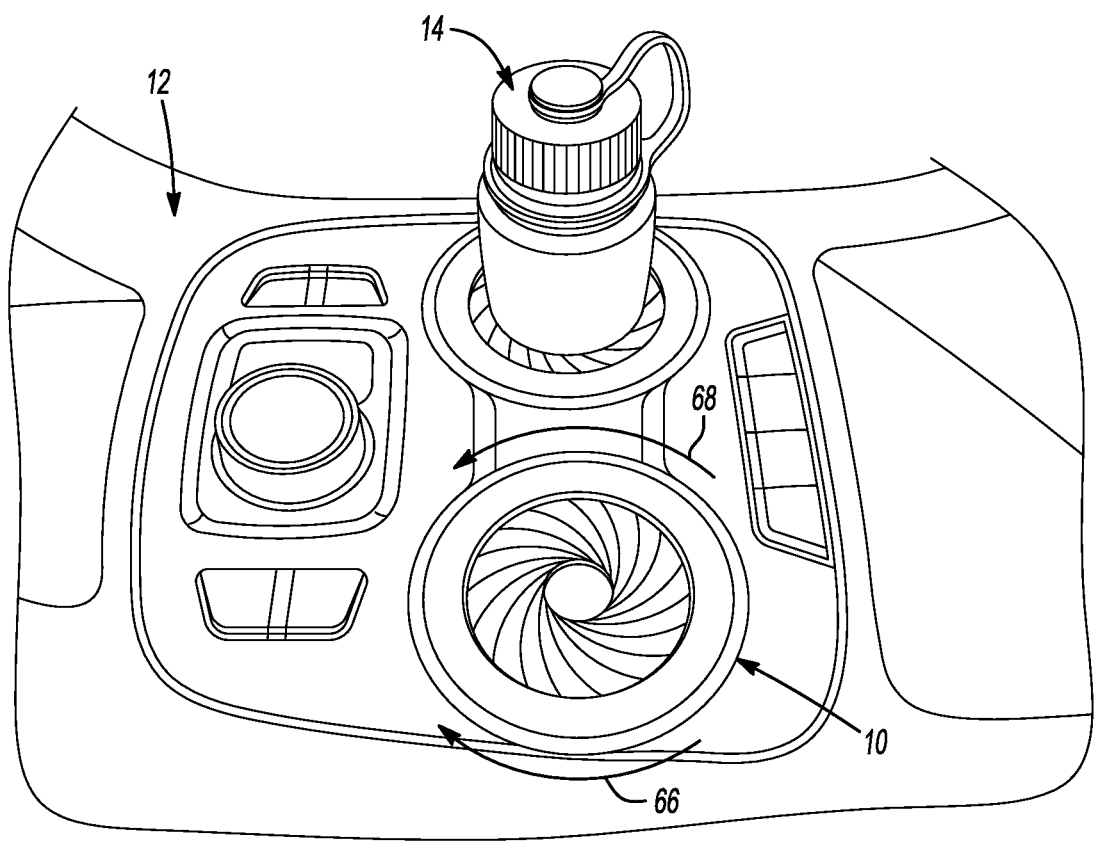
FIG. 1 is an environmental view of an adjustable cup holder assembly for a vehicle in accordance with one example of the present disclosure.

Referring to FIG. 1, an adjustable cup holder assembly 10 for a vehicle 12 is provided. As shown, the assembly 10 provides a variable holding mechanism that receives various sized items, such as sealed cups, to be held or gripped therein, providing enhanced securement of the various sized items. Moreover, the assembly 10 is configured to receive an item, e.g. a sealed liquid container or cup 14, and is adjustable to the profile of the item. In this example, the assembly 10 receives the container 14 and is adjustable to engage about the outer diameter or periphery of the container 14, providing enhanced securement of the container 14 held by the assembly 10. The assembly 10 also requires less space under a center console of the vehicle 12.

Figure 2:
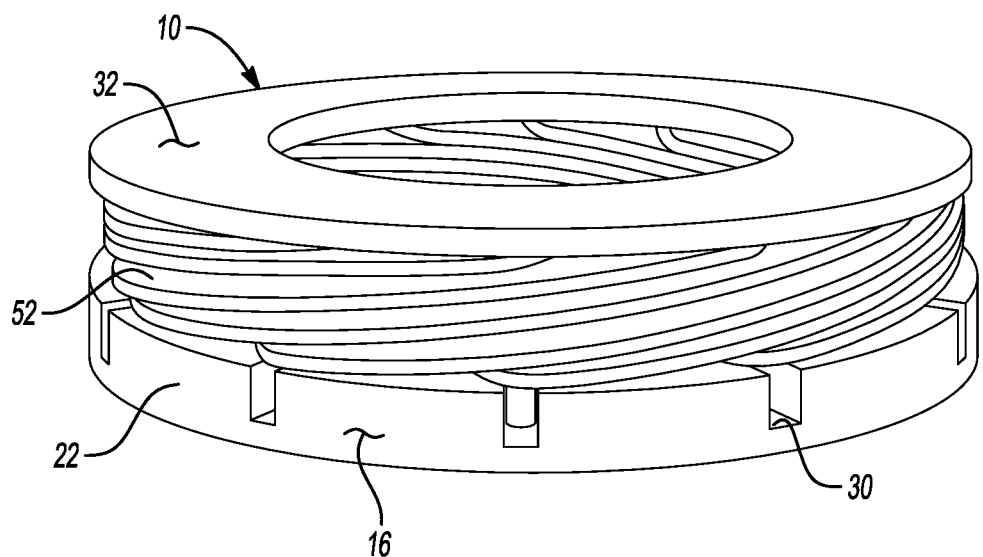
FIG. 2 is a side view of the adjustable cup holder assembly in FIG. 1.
Figure 3:
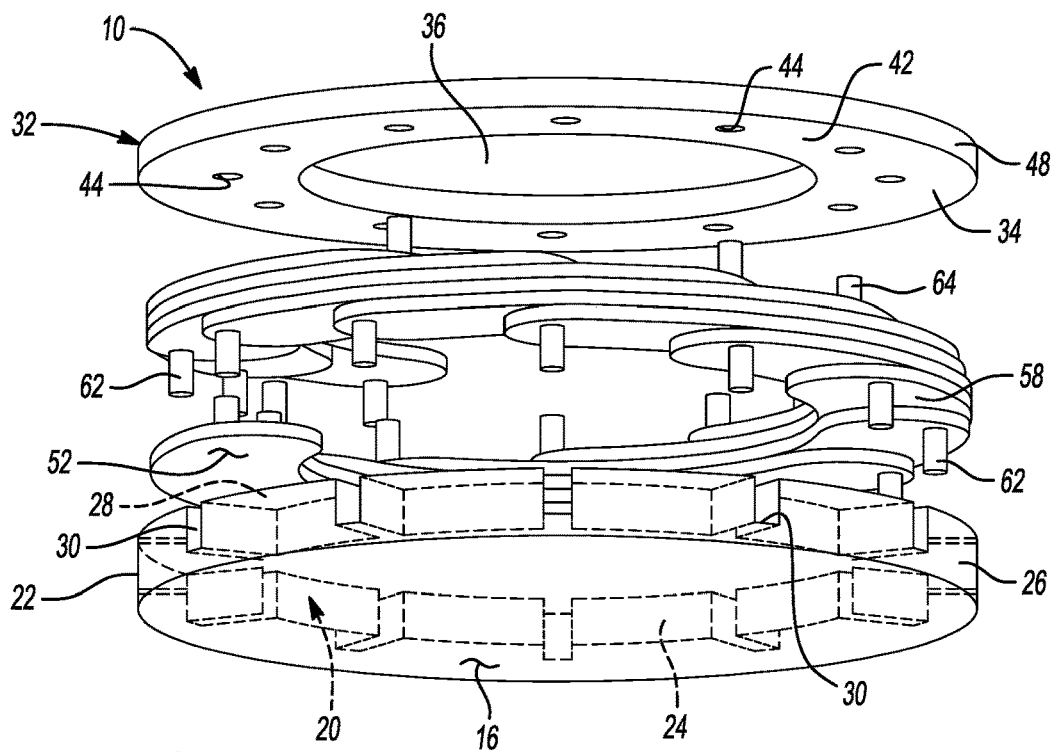
FIG. 3 is an exploded view of the assembly in FIG. 2. according to one embodiment of the present disclosure.

As shown in FIGS. 2 and 3, the assembly 10 comprises a circular cam 16 including a base 18 having a center recess 20 formed thereon, defining an outer body 22. In this example, the recess 20 has an opening. Alternatively, the recess 20 may be formed through the base 18, forming a center hole through the circular cam. As shown, outer body 22 has an inner circular wall 24 within which the recess 20 is formed. Moreover, the outer body 22 has an outer circular wall 26, defining a periphery of the outer body 22.

The outer body 22 further includes a first surface 28 having a plurality of open channels 30 formed thereon, extending radially. Each of the plurality of channels 30 is formed on the first surface 28 from the outer wall 26 to the inner wall 24. In this embodiment, the channels 30 are formed linearly from the outer wall 26 to the inner wall 24. However, each channel 30 may be formed in any other manner, e.g. arcuately, from the outer wall 26 to the inner wall 24 without departing from the spirit or scope of the present disclosure.

In this embodiment, the assembly 10 further comprises a circular twist top 32 including an outer portion 34 having a center opening 36 formed therethrough. As shown, the outer portion 34 includes a top surface 40 and a bottom or connecting surface 42 42. The connecting surface 42 has a plurality of apertures 44 formed thereon. In this embodiment, each aperture 44 may be an indentation formed on the connecting surface 42. Alternatively, apertures 44 may be formed through the outer portion 34, defining holes, without departing from the scope or spirit of the present disclosure.

Moreover, the twist top 32 includes a rotation axis A through the center opening 36 and is axially aligned with the circular cam. Preferably, the twist top 32 comprises a circumferential wall 48 having a gripping member 50 disposed thereabout for gripping and rotating the twist top 32. In this embodiment, the gripping member 50 may be a film attached to the circumferential wall 48. However, the circumferential wall 48 may have a surface marks formed thereon to allow for enhanced gripping without departing from the spirit or scope of the present disclosure.

Figure 4A:
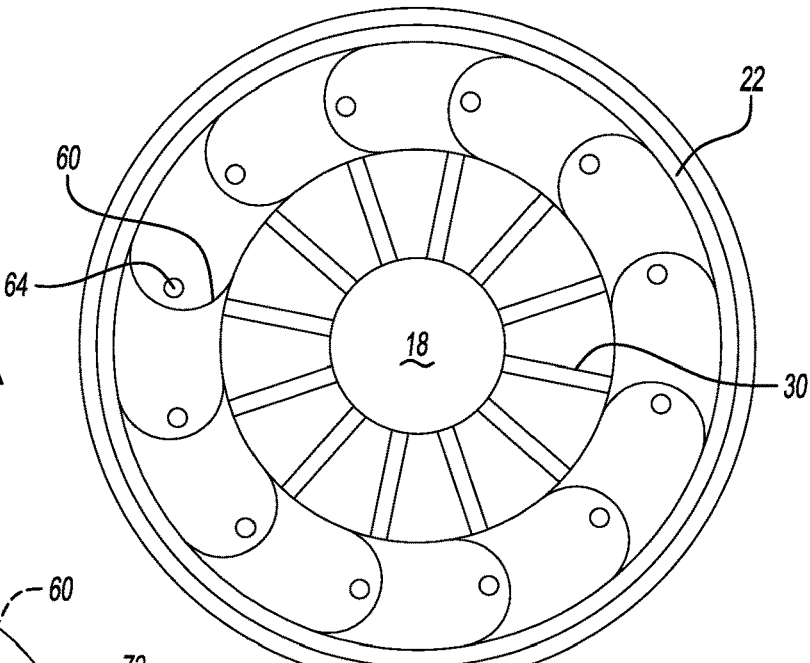
FIG. 4A is a top or plan view of the assembly in FIG. 2.
Figure 4B:
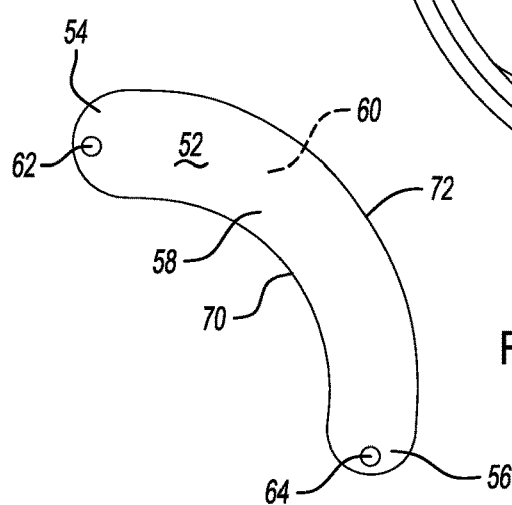
FIG. 4B is a plan view of an arcuate member of the assembly in accordance with one embodiment of the present disclosure.

Referring to FIGS. 3-4B, the assembly 10 further comprises a plurality of arcuate members 52 disposed on the first surface 28. As shown, each arcuate member 52 has a first end 54 arcuately extending to a second end 56. Preferably but not necessarily, each arcuate member 52 is symmetrical in shape relative to the first and second ends 56. In this embodiment, each arcuate member 52 has a first side 58 and an opposing second side 60. The first side 58 has a first pin 62 extending therefrom adjacent the first end 54. Each of the first pins 62 is slidably disposed in one of the plurality of channels 30. As a result, each first end 54 of the plurality of arcuate members 52 is disposed on and in contact with the first surface 28 such that the arcuate members 52 are in partial stacking relationship.

Further reference to FIGS. 3-4B, the second side 60 of each arcuate member 52 has a second pin 64 extending therefrom adjacent the second end 56. Moreover, each of the second pins 64 is disposed in one of the plurality of apertures 44 of the twist top 32, connecting the arcuate members 52 with the circular twist top 32. Each of the first pins 62 slidably moves along one of the plurality of channels 30 when the twist top 32 is rotated in one of a first direction 66 (e.g. clockwise) and a second direction 68 (e.g. counter clockwise). Rotation of the twist top 32 radially moves the arcuate members 52 to close and open the recess 20, respectively. As each of the first pins 62 slidably moves along one of the plurality of channels 30, each of the second pins 64 remains stationary relative to the twist top 32.

As shown, each of the plurality of arcuate members 52 has a concave side 70 and a convex side 72. When the assembly 10 is in operation, a portion of the convex side 72 is aligned with the outer wall 26 of the outer body 22 of the circular cam. The convex side 72 has a curvature which preferably defines a variability of the opening/closing of the recess 20 when the twist top 32 is rotated in one of the first and second directions 66, 68 as will be described in greater detail below.

The twist top 32 is rotatable about the rotation axis A in one of the first and second directions 66, 68 relative to the circular cam. Such rotation of the twist top 32 slidably moves the first pins 62 along one of the plurality of channels 30, thereby radially moving the arcuate members 52 to open and close the recess 20. As mentioned, the curvature of the convex side 72 of each arcuate member 52 defines the variability of the opening and closing (or covering) of the recess 20 when the twist top 32 is rotated in one of the first and second directions 68. For example, as the twist top 32 is rotated in the first direction 66 (e.g., clockwise), more of the recess 20 is covered per rotational unit given a greater curvature.

In use, the first ends 54 of the plurality of arcuate members 52 are configured to radially slide inward along the first surface 28 when the twist top 32 is rotated in the first direction 66 (e.g., clockwise) to close or cover the recess 20 relative to the outer body 22. That is, the opening of the recess 20 is variably covered by the arcuate members 52 when the twist top 32 is rotated in the first direction 66. Accordingly, the first ends 54 of the plurality of arcuate members 52 radially slide outward along the first surface 28 when the twist top 32 is rotated in the second direction 68 to open the recess 20 relative to the outer body 22. Hence, the opening of the recess 20 is variably uncovered when the twist top 32 is rotated in the second direction 68. When an item such as a sealed cup is disposed within the recess 20, the twist top 32 is rotated in the first direction 66, thereby moving the arcuate members 52 to engage the cup along the concave side 70 of each arcuate member.

Additionally, the arcuate members 52 are connected to the twist top 32 and the circular cam 16 such that, when the twist top 32 is rotated about the axis A, the arcuate members 52 slidably move uniformly together along the first surface 28. That is, when the twist top 32 is rotated in the first direction 66, the arcuate members 52 move uniformly together to close or cover the recess 20. When moving uniformly together, the arcuate members 52 define a circular gripping surface which may engage the sealed cup held within the assembly 10. Engagement of the cup serves as a gripping feature for added securement of the cup within the recess 20.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An adjustable cup holder assembly with a slide mechanism for a vehicle, the assembly comprising:
    a circular cam including a base having a center recess formed thereon defining an outer body, the outer body including a first surface having a plurality of open channels formed radially thereon;
    a circular twist top including an outer portion having a center opening formed therethrough, the outer portion including a connecting surface having a plurality of apertures formed thereon;
    a plurality of arcuate members disposed on the first surface, each arcuate member having a first end arcuately extending to a second end, each arcuate member having a first side and an opposing second side, the first side having a first pin extending therefrom adjacent the first end, each of the first pins slidably disposed in one of the plurality of channels, the second side having a second pin extending therefrom adjacent the second end, each of the second pins disposed in one of the plurality of apertures,
    wherein each of the first pins is slidably movable along one of the plurality of channels when the twist top is rotated in one of a first direction and a second direction radially moving the arcuate members to open and close the recess,
    wherein the outer body of the circular cam has an outer wall and an inner wall, each of the plurality of open channels being radially formed on the first surface through the outer wall and through the inner wall.

2. The assembly of claim 1 wherein each first end of the plurality of arcuate members is disposed on and in contact with the first surface such that the arcuate members are in partial stacking relationship.

3. The assembly of claim 1 wherein the outer body of the circular cam 16 has an outer wall and an inner wall, each of the plurality of arcuate members having a concave side and a convex side, a portion of the convex side being aligned with the outer wall of the outer body.

4. The assembly of claim 1 wherein the twist top includes a rotation axis through the center opening and is axially aligned with the circular cam, the twist top being rotatable about the rotation axis in one of the first and second directions relative to the circular cam to slidably move the first pins along one of the plurality of channels, radially moving the arcuate members to open and close the recess.

5. The assembly of claim 1 wherein the twist top comprises a circumferential wall having a gripping member disposed thereabout for gripping and rotating the twist top.

6. The assembly of claim 1 wherein the first ends of the plurality of arcuate members radially slide inward along the first surface when the twist top is rotated in the first direction to close the recess and wherein the first ends of the plurality of arcuate members radially slide outward along the first surface when the twist top is rotated in the second direction to open the recess relative to the outer body.

7. The assembly of claim 1 wherein the recess has an opening, the opening being variably covered by the arcuate members when the twist top is rotated in the first direction and variably uncovered when the twist top is rotated in the second direction.

8. The assembly of claim 7 wherein outer body has an outer wall and an inner wall, each of the plurality of arcuate members having a concave side and a convex side, the convex side having a curvature defining a variability of the opening of the recess when the twist top is rotated in one of the first and second directions.

9. An adjustable cup holder assembly with a slide mechanism for a vehicle, the assembly comprising:
   a circular cam 16 including a base having a center recess formed thereon defining an outer body, the outer body including a first surface having a plurality of open channels formed radially thereon;
   a circular twist top including an outer portion having a center opening formed therethrough, the outer portion including a connecting surface having a plurality of apertures formed thereon;
   a plurality of arcuate members disposed on the first surface, each arcuate member having a first end arcuately extending to a second end, each arcuate member having a first side and an opposing second side, the first side having a first pin extending therefrom adjacent the first end, each of the first pins slidably disposed in one of the plurality of channels, the second side having a second pin extending therefrom adjacent the second end, each of the second pins disposed in one of the plurality of apertures,
   wherein each of the first pins is slidably movable along one of the plurality of channels when the twist top is rotated in one of a first direction and a second direction radially moving the arcuate members to open and close the recess,
   wherein the twist top includes a rotation axis through the center opening and is axially aligned with the circular cam, the twist top being rotatable about the rotation axis in one of the first and second directions relative to the circular cam to slidably move the first pins along one of the plurality of channels, radially moving the arcuate members to open and close the recess,
   wherein the outer body of the circular cam has an outer wall and an inner wall, each of the plurality of open channels being radially formed on the first surface through the outer wall and through the inner wall.

10. The assembly of claim 9 wherein each first end of the plurality of arcuate members is disposed on and in contact with the first surface such that the arcuate members are in partial stacking relationship.

11. The assembly of claim 9 wherein the outer body of the circular cam 16 has an outer wall and an inner wall, each of the plurality of arcuate members having a concave side and a convex side, a portion of the convex side being aligned with the outer wall of the outer body.

12. The assembly of claim 9 wherein the twist top comprises a circumferential wall having a gripping member disposed thereabout for gripping and rotating the twist top.

13. The assembly of claim 9 wherein the recess has an opening, the opening being variably covered by the arcuate members when the twist top is rotated in the first direction and variably uncovered when the twist top is rotated in the second direction.

14. The assembly of claim 13 wherein outer body has an outer wall and an inner wall, each of the plurality of arcuate members having a concave side and a convex side, the convex side having a curvature defining a variability of the opening of the recess when the twist top is rotated in one of the first and second directions.

15. An adjustable cup holder assembly with a slide mechanism for a vehicle, the assembly comprising:
   a circular cam including a base having a center recess formed thereon defining an outer body, the outer body including a first surface having a plurality of open channels formed radially thereon;
   a circular twist top including an outer portion having a center opening formed therethrough, the outer portion including a connecting surface having a plurality of apertures formed thereon;
   a plurality of arcuate members disposed on the first surface, each arcuate member having a first end arcuately extending to a second end, each arcuate member having a first side and an opposing second side, the first side having a first pin extending therefrom adjacent the first end, each of the first pins slidably disposed in one of the plurality of channels, the second side having a second pin extending therefrom adjacent the second end, each of the second pins disposed in one of the plurality of apertures, wherein each of the first pins is slidably movable along one of the plurality of channels when the twist top is rotated in one of a first direction and a second direction radially moving the arcuate members to open and close the recess,
   wherein the twist top includes a rotation axis through the center opening and is axially aligned with the circular cam, the twist top being rotatable about the rotation axis in one of the first and second directions relative to the circular cam to slidably move the first pins along one of the plurality of channels,
   wherein the first ends of the plurality of arcuate members radially slide inward along the first surface when the twist top is rotated in the first direction to close the recess and wherein the first ends of the plurality of arcuate members radially slide outward along the first surface when the twist top is rotated in the second direction to open the recess relative to the outer body,
   wherein the outer body of the circular cam has an outer wall and an inner wall, each of the plurality of open channels being radially formed on the first surface through the outer wall and through the inner wall.

16. The assembly of claim 15 wherein each first end of the plurality of arcuate members is disposed on and in contact with the first surface such that the arcuate members are in partial stacking relationship.

* * * * *